June 29, 1954  M. HONIG  2,682,418
BICYCLE STABILIZER
Filed Feb. 3, 1953
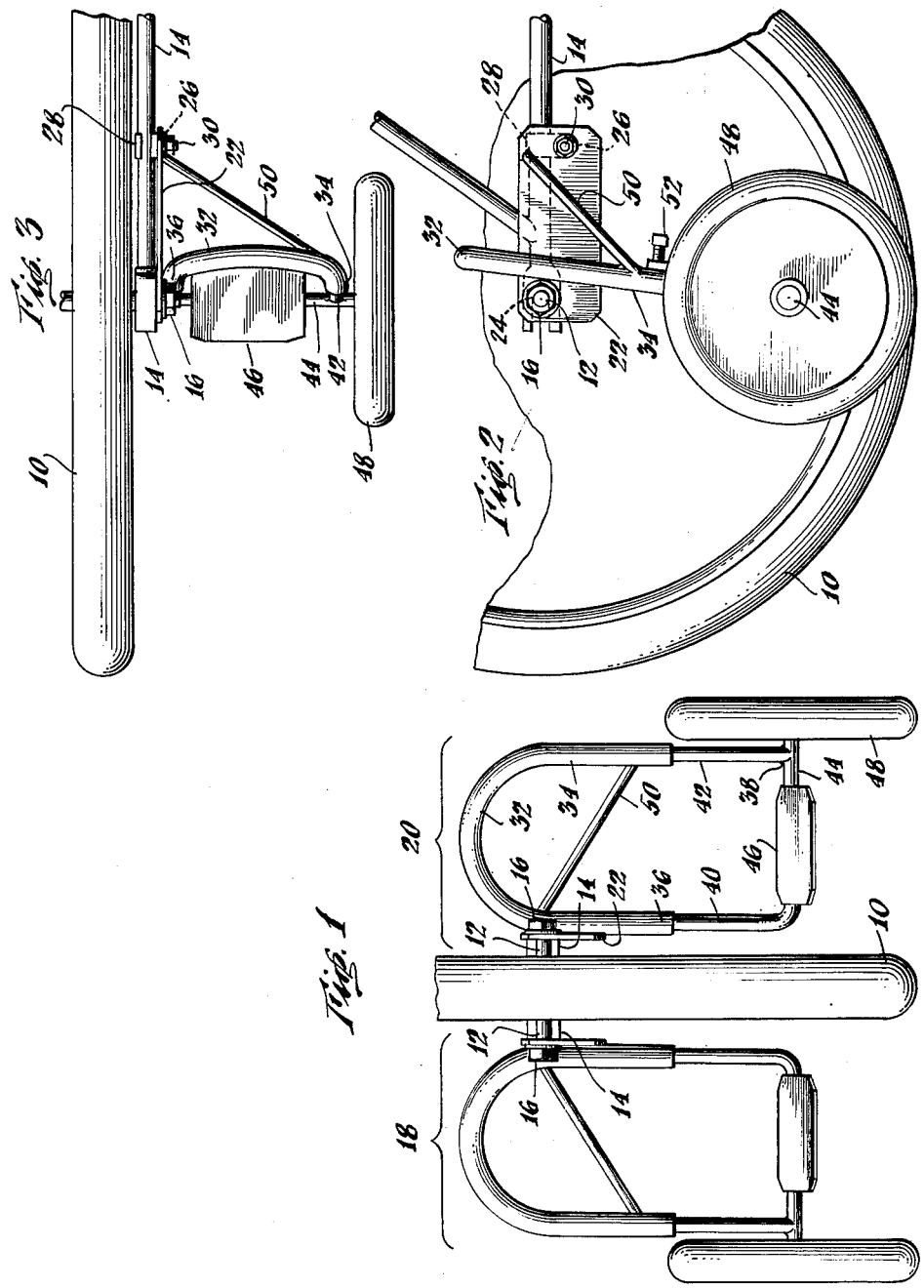
INVENTOR.
Michael Honig
BY Robert S. Dunham
ATTORNEY Patented June 29, 1954

2,682,418

UNITED STATES PATENT OFFICE 2,682,418

BICYCLE STABILIZER

Michael Honig, New York, N. Y.

Application February 3, 1953, Serial No. 334,954

3 Claims. (Cl. 280—304)

1

This invention relates to bicycles and particularly to an improved stabilizer assembly adapted for attachment to bicycles to prevent or limit the tipping thereof.

Stabilizer assemblies of the general type described are of particular utility for beginners learning to ride bicycles, as their utilization permits a gradual development of the necessary sense of balance and coordination of pedal and manual operations. Their use to prevent tipping or overturning also markedly lessens the likelihood of injury to the user and damage to the bicycle during the learning stages.

Stabilizer assemblies are usually initially installed with the stabilizer wheels contacting the ground on both sides of the bicycle and in effect convert the bicycle into a multiwheeled vehicle having the stability of a tricycle. After a brief period of use with the stabilizer wheels so positioned, during which time the user develops the necessary coordination of pedal and steering dexterity, the stabilizer wheels are progressively and incrementally raised so as to progressively increase the amount of permissible tipping in accordance with the development of the required sense of balance of the user. After the necessary sense of balance has been acquired, the stabilizer assembly is then usually removed, and the cycle is used as a conventional bicycle.

The effective utilization of a stabilizer assembly during the learning stages requires that the height of the stabilizer wheels be successively and incrementally raised in accordance with the learning progress of the user. As such, it is desirable that the necessary vertical height adjustments to the stabilizer assembly be made in as simple and easy manner as possible. Conventional stabilizer assemblies now in use and taught by the art are usually provided with a mounting plate member having a vertically disposed elongated slot therein to accommodate the axle of the rear or the driving wheel of the bicycle. In this conventional type of stabilizer assembly mounting, the necessary vertical height adjustment is effected by loosening the axle mounting nuts and manually displacing the stabilizer mounting plate to the desired height and then resecuring the axle nuts to fix the stabilizer in position. This procedure is complicated by the fact that the conventional chain drive also requires a longitudinal presetting of the position of the rear wheel in order to have a desirable amount of tension on the chain drivingly connecting the wheel sprocket with the pedal sprocket. As such the necessary vertical height adjustment of the conventional slotted mounting plate stabilizer assemblies is rendered unduly complicated due to the necessity of positioning the plate members vertically relative to the rear wheel axle and simultaneously to longitudinally adjust the rear wheel axle in order to maintain the proper tension on the sprocket chain. This adjustment usually requires the attendance of at least two persons as the multiple adjustment is performed by a single individual only with difficulty.

This invention is directed to overcome this difficulty and may be briefly described as an improved stabilizer assembly having a mounting plate adapted to be fixedly mounted on the axle of the rear wheel of the bicycle and being of a structure that permits the necessary height adjustments of the stabilizer wheels to be effected independent of adjustment of the mounting plate relative to the rear wheel axle. This desirable separability of adjustment is accomplished by mounting a generally U-shaped tubular supporting member on the mounting plate and slidably supporting the stabilizer wheel axle within the arms of the U-shaped mounting member. As such, the necessary vertical height adjustment required for proper utilization of the stabilizer assembly is simply and rapidly effected without any necessity for adjustment of the positional relationship of the rear wheel axle.

Apart from the above, bicycle stabilizer assemblies are used only for a relatively brief period and therefore should be of simple and inexpensive construction that is adapted to large scale production. The stabilizer assembly forming the subject matter of this invention meets these necessary commercial requirements.

The object of this invention is the provision of an improved stabilizer assembly for bicycles in which the necessary vertical height adjustment is effected independent of the mounting thereof to a bicycle.

Other objects and advantages of the invention will be pointed out in the following disclosure and claims and illustrated in the accompanying drawings which disclose by way of example the principle of the invention and the presently preferred embodiment of the bicycle stabilizer assembly incorporating that principle.

Referring to the drawings:

Fig. 1 is a rear elevational view, partially in section, of the presently preferred embodiment of the stabilizer assembly as installed on a bicycle;

Fig. 2 is a side elevational view of the right hand stabilizer assembly; and

Fig. 3 is a plan view of the stabilizer assembly illustrated in Fig. 2.

Referring to the drawings, the stabilizer assembly therein illustrated and forming the subject matter of the invention is shown as installed adjacent the rear wheel of a bicycle of conventional construction. The bicycle is schematically shown as comprising a rear wheel 10, rear axle 12, and horizontally disposed rear axle frame member 14 with the axle 12 being secured to the frame member 14 by the usual axle mounting nuts 16. Only so much of the bicycle is shown as is necessary to illustrate how the stabilizer is secured thereto, it being clearly understood that the bicycle construction per se is conventional in nature and does not form a part of this invention.

As the left hand and right hand stabilizer assemblies 18 and 20 are mirror copies of each other, only the right hand stabilizer will be described in detail in the interests of brevity. The presently preferred embodiment of the stabilizer assembly includes a relatively small mounting plate 22 positioned adjacent the horizontal frame member 14 and being provided with a suitably sized axle receiving aperture 24 and a clamp receiving aperture 26 disposed at predetermined locations therein. The aperture 24 is adapted to receive the rear axle 12 and to be positioned in engagement with the frame member 14 by the rear axle nuts 16. The auxiliary aperture 26 is adapted to support a suitable clamp 28 secured to the horizontal frame member 14 by a nut 30.

Positioned perpendicularly to the plane of the mounting member 22 and secured thereto as by welding is a tubular generally U-shaped frame member 32. The U-shaped member 32 is preferably formed of standard sized hollow tubing and is shaped to provide a pair of substantially vertically disposed parallel arm members 34 and 36. Slidably disposed within the arm members 34 and 36 are the arms 42 and 40 of the axle supporting member 38. The arm members 40 and 42 respectively of the axle supporting member 38 perpendicularly terminate in a horizontally disposed axle member 44 which extends beyond the arm 42 and supports the stabilizer wheel 48. The axle supporting member 38 is simply and inexpensively formed by bending a bar to form substantially a right angle and thus integrally provide the arm 40 and axle 44. The other arm 42 may be conveniently welded at the desired location on axle member 44 to form the complete unit.

In the preferred embodiment illustrated in the drawing, the U-shaped frame member 32 is inclined a slight amount so as to dispose the axle 44 vertically beneath the axle 12 when the wheel 48 is positioned in contact with the ground. Because of the fact that the wheel 48 is disposed a predetermined distance from the mounting plate 22 and thus creates a lever arm effect, the U-shaped frame member 32 is provided with both longitudinal and vertical support by a single reenforcing strut 50 diagonally extending between the forward portion of the mounting plate 22 and the lower portion of the arm 34 and secured thereto at both ends by any suitable method such as welding.

The illustrated stabilizer assembly also includes a riding step plate 46 secured as by welding in horizontally disposed position intermediate the arms 40 and 42 on the axle member 44. This provides in a simple and inexpensive manner the conventional auxiliary riding plate found on tricycles and which also may be used as an aid in mounting the cycle.

As illustrated in the drawings, the stabilizer wheels 48 at initiation of use are preferably positioned in contact with the ground. When so positioned the arm members 40 and 42 of the axle supporting member 38 are disposed in extended position in relation to the U-shaped frame member 32. The wheels 48 are fixed in such position by the readily accessible stop nut 52 mounted on the lower portion of the outer arm 34. The stop nut 52, when suitably tightened, will effectively secure the arm 42 within the arm 34 and thus prevent a vertical displacement of the wheel 48 relative to the U-shaped frame member 32. After the initial brief period of use as a multiwheeled vehicle, the stabilizer assemblies are easily raised by loosening the stop nut 52 and displacing the arms 40 and 42 further by any desired amount into arms 34 and 36 of frame member 32. At any desired height the stop nut 52 is retightened and the wheel 48 is thus firmly positioned at any predetermined level above the ground.

Through the above described construction there is provided a simple and inexpensive stabilizer assembly that is readily and simply adjusted in height without the difficulty attendant the conventional stabilizer assemblies known to the art.

In accordance with the provisions of the patent statutes, I have herein described the principle of operation of this invention, together with the elements which I now consider to constitute a workable embodiment thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. A bicycle stabilizer for mounting adjacent the rear wheel of a bicycle comprising a mounting plate having a bicycle wheel axle receiving aperture therein, a generally inverted U-shaped frame member having a pair of downwardly dependent hollow arms, said frame member being mounted in a plane substantially perpendicular to that of said mounting plate with one of said arms being secured thereto, a complemental axle supporting member having a pair of complemental arms sized to be slidably contained within said hollow arms and a fastening member included in one of said hollow arms and engageable with the complemental arm of said axle supporting member for securing said axle supporting member relative to said frame member.

2. The stabilizer as set forth in claim 1 wherein said fastening member is a stop nut threadedly mounted in one of said hollow arms.

3. A bicycle stabilizer for mounting adjacent the rear wheel of a bicycle comprising a mounting plate having a bicycle wheel axle receiving aperture therein, a generally inverted U-shaped frame member having a pair of downwardly dependent hollow arms, said frame member being mounted in a plane substantially perpendicular to that of said mounting plate with one of said arms being secured thereto, an axle supporting member including a pair of complemental arms slidably contained within said hollow arms and an axle member mounted substantially perpendicular to said pair of complemental arms, a stabilizer wheel mounted on said axle member and a fastening member included in one of said hollow arms and engageable with the complemental arm contained therein for preventing displacement of said axle supporting member relative to said frame member.

References Cited in the file of this patent

UNITED STATES PATENTS

| Number | Name | Date |
|---|---|---|
| 561,262 | Lincoln | June 2, 1896 |
| 577,261 | Konrad | Feb. 16, 1897 |
| 711,922 | Corneil | Oct. 21, 1902 |
| 2,647,764 | Anderson | Aug. 4, 1953 |